Patented Mar. 13, 1923.

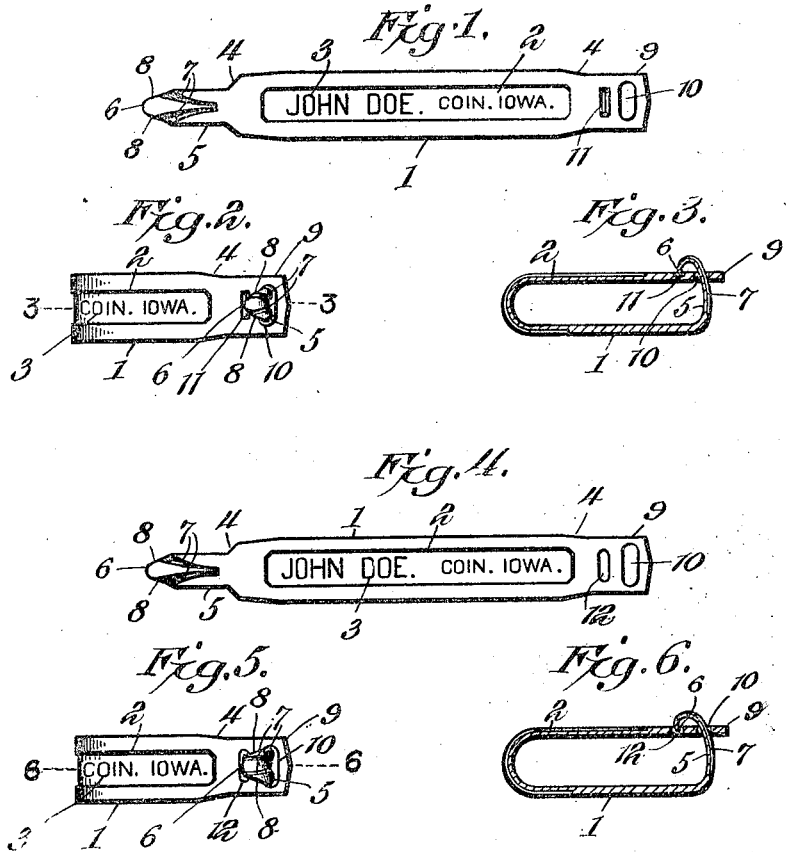

1,447,982

UNITED STATES PATENT OFFICE.

EDWIN F. HENNEFER, OF SALT LAKE CITY, UTAH, ASSIGNOR TO SALT LAKE STAMP COMPANY, OF SALT LAKE CITY, UTAH, A CORPORATION OF UTAH.

EAR TAG.

Application filed August 26, 1922. Serial No. 584,543.

*To all whom it may concern:*

Be it known that I, EDWIN F. HENNEFER, a citizen of the United States, residing at Salt Lake City, in the county of Salt Lake and State of Utah, have invented a new and useful Improvement in Ear Tags, of which the following is a specification.

This invention relates to stock marking devices and more particularly to ear tags.

The object is to improve the construction of tags for application to the ears of sheep, hogs, and cattle, by providing means for embedding the point of the prong within the body of the tag so that said point may not come into contact with brush, or wire, which would tend to open the clinched prong, or tear the tag from its position and injure the ear of the animal.

The invention is designed as an improvement on the tag shown and described in Patent No. 1,249,515, issued to J. Schaub, Dec. 11, 1917.

A full and complete understanding of the invention may be obtained from a consideration of the following detailed description, taken in connection with the accompanying drawing forming a part of this specification, it being understood that while the drawing shows a practical form of the invention, the latter is not confined to strict conformity with the showing thereof, but may be changed or modified, so long as such changes or modifications mark no material departure from the salient features of the invention as pointed out in the appended claims.

In the drawings, in which similar reference characters designate corresponding parts throughout the several figures:

Figure 1 is a plan view of one form of the improved tag, prior to being bent into shape;

Figure 2 is a plan view of the same, after being bent and clinched;

Figure 3 is a longitudinal sectional view taken on the line 3—3 of Fig. 2;

Figure 4 is a plan view, similar to Figure 1, but showing a modified form of the invention;

Figure 5 is a view similar to Figure 2, of the modification;

Figure 6 is a longitudinal sectional view taken on the line 6—6 of Figure 5.

The tag comprises an elongated strip 1, formed preferably of some light material such as aluminum, so as to reduce the weight. The strip 1 is provided intermediate of its ends with a depression forming a panel 2, whose long sides are spaced from the side edges of the strip, while the ends of the panel 2 are likewise spaced from the ends of the strip. The panel 2 is designed to have stamped or otherwise impressed thereon the name and address of the owner of the stock, as indicated at 3 in the drawing, space being allowed, if desired, to include other indicia.

Adjacent to the ends of the panel 2, the strip 1 is reduced, as indicated at 4, such reduction being greater at one end than the other to provide a longitudinally disposed tongue or prong 5, arranged along the center line of the strip and terminating in a rounded and sharpened point 6, for the purpose of penetrating the ear of the animal to which the tag is to be applied. The prong 5 is provided with inwardly and rearwardly directed, arcuate grooves 7, which facilitate the necessary bending and clinching action of the prong while under the action of the tool used in the application of the tag. The point 6 is preferably spoon shaped and is connected to the prong 5 by tapered cutting edges 8 on opposite sides thereof, so that when entering the ear of the animal, it will cause a mere slit therein and pass through to be clinched without causing any undue suffering, injury or mutilation of the ear.

At the opposite end of the strip 1, where the reduction 4 in its width occurs, the extension 9, thus formed, is provided at its terminal with a transverse slot 10 arranged close to the end thereof. The ends of the slot 10, which are located adjacent to the side edges of the extension 9, are preferably rounded for the purpose of receiving the prong 5 and allowing the prong to pass freely through the same after the tag has been bent into a loop, as indicated in Figures 3 and 6 of the drawing.

The extension 9 is further provided with a transversely disposed groove or seat 11 located between the slot 10 and the adjacent end of the panel 2, the said groove 11 being located close to the slot 10 and of less length than the same, the width being substantially one-half of the slot 10. The groove 11 does not extend entirely through the strip 1, and may be provided with tapering V-shaped sides, or the same may be rounded as desired.

When the strip 1 has been formed into a loop, as stated, the prong 5, through the action of the applying device, which is usually in the form of a pair of pliers, as illustrated in the aforesaid patent, is forced through the ear of the animal and thence through the terminal slot 10 of the tag, the jaws of the pliers serving to bend the penetrating portion of the prong over toward the body of the tag, and to bend the same inwardly, in a clinching action, to cause the point 6 of the prong to enter the transverse groove 11 and be firmly seated therein.

In Figures 4, 5 and 6, a modified form of the invention is illustrated, wherein, in place of the groove 11, a slot 12 is provided. This is the preferred construction. This slot is located in the same position as said groove and passes entirely through the extension 9, and is adapted to receive the end of the prong 5 in the same manner as heretofore described, the point 6 however being prevented from projecting through the slot 12 and into the space between the arms of the loop-shaped tag, so that the same may not come into contact with the ear of the animal.

Since the groove 11 and the slot 12 in the two forms are considerably shorter and narrower than the terminal slot 10, the tag is not materially weakened thereby, and the strength of the clinch is increased.

When the tag is applied to the ear of the animal and the point of the prong seated either in the groove 11 or the slot 12, it will be seen that all danger of the same being caught by brush or other obstructions is eliminated, and the danger of accidentally tearing the tag from its position is prevented.

In the preferred form of the invention, wherein the slot 12 is employed, as illustrated in Figures 4, 5 and 6, the point of the prong is prevented from moving inwardly and into contact with the ear of the animal, by reason of the inclination of that portion of the prong which traverses the terminal slot 10, as will be clearly understood, and the said inclination also serves to prevent any outward movement of the prong to unseat the point from either the slot 12 or the groove 11.

From the foregoing, it will be seen that the improvement in ear tags or stock marking devices may be incorporated at a very small cost, and that the provision of the groove or slot materially increases the efficiency of the same by strengthening the clinching action of the prong.

What is claimed is:—

1. An ear tag comprising an elongated metallic strip having a pointed and sharpened prong at one end, and a transversely disposed slot at the other end, said strip being adapted to be bent into loop shape and the prong passed through the said slot and clinched inwardly towards the bend of the loop, and then backwardly to form a return bend, said strip having a seat for receiving the end of the prong when so bent, said seat being spaced from the slot and having its length and width less than said slot.

2. An ear tag comprising an elongated metallic strip having a pointed and sharpened prong at one end, and a transversely disposed slot at the other end, said strip being adapted to be bent into loop shape and the prong passed through the said slot and clinched inwardly towards the bend of the loop, and then backwardly to form a return bend, said strip having a transversely disposed slot spaced from the end slot for receiving the inwardly and backwardly directed point of the prong, said slot being shorter and narrower than the first-mentioned slot.

3. An ear tag comprising an elongated metallic strip having a reduced end pointed and sharpened to provide an ear penetrating prong and being provided adjacent to its other end with a transversely disposed slot and a transverse seat inwardly from the outer face of the strip adjacent to the slot, said strip being adapted to be bent into a loop-shape and the prong to pass through the terminal slot at an angle and the point thereof to be curled or clinched into said seat.

In testimony, that I claim the foregoing as my own, I have hereto affixed my signature.

EDWIN F. HENNEFER.